ively may be caused to fall upon the pentagonal prism, through the additional prism. The light rays are reflected on the front lower reflection plane of said pentagonal prism which directs the rays to an eyepiece so that the exposure condition information is visible in the vision field of the finder.

United States Patent [19]
Kuramoto

[11] 3,757,656
[45] Sept. 11, 1973

[54] SINGLE LENS REFLEX CAMERA
[75] Inventor: Yoshio Kuramoto, Toyonaka, Japan
[73] Assignee: Minolta Camera Kabushiki Kaisha, Osaka-fu, Japan
[22] Filed: Nov. 15, 1971
[21] Appl. No.: 198,519

[30] Foreign Application Priority Data
Nov. 17, 1970 Japan.............................. 45/113535

[52] U.S. Cl. ...................................... 95/11 V, 95/42
[51] Int. Cl. ............................................ G03b 19/20
[58] Field of Search................... 95/11, 42; 88/1.5 R

[56] References Cited
UNITED STATES PATENTS
3,094,911 6/1963 Reiche et al....................... 95/42 X
3,250,196 5/1966 Ort et al.............................. 88/1.5 R
3,433,141 3/1969 Ruhle et al......................... 88/1.5 R FOREIGN PATENTS OR APPLICATIONS
242,502 9/1965 Austria................................ 95/11 V Primary Examiner—Samuel S. Matthews
Assistant Examiner—E. M. Bero
Attorney—Watson, Cole, Grindle and Watson

[57] ABSTRACT

A single lens reflex camera having a pentagonal prism view finder is provided with an additional prism disposed on the roof-type reflection surface of the pentagonal prism. The light rays from exposure condition information indicating devices such as a diaphragm opening indicator and a range finder may be caused to fall upon the pentagonal prism, through the additional prism. The light rays are reflected on the front lower reflection plane of said pentagonal prism which directs the rays to an eyepiece so that the exposure condition information is visible in the vision field of the finder.

4 Claims, 8 Drawing Figures

PATENTED SEP 11 1973 3,757,656
FIG. 1
FIG. 2
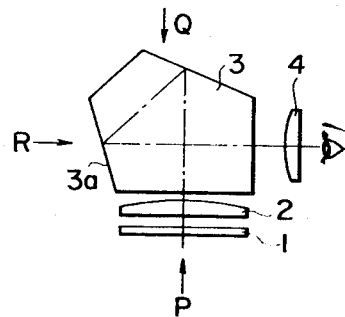
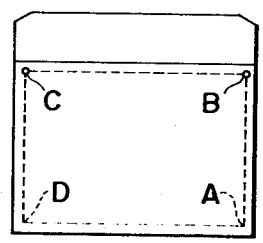
FIG. 3
FIG. 4
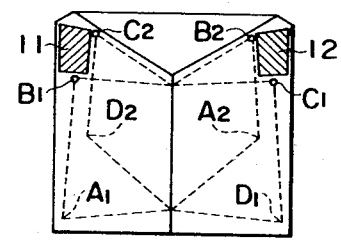
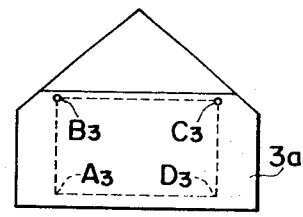
FIG. 5
FIG. 6
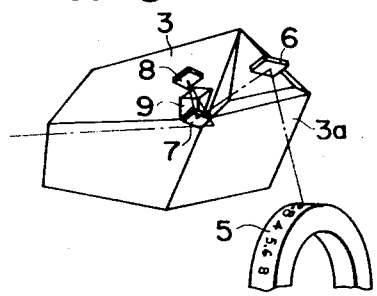
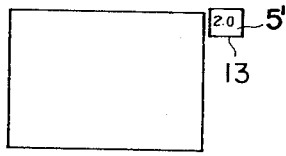
FIG. 7
FIG. 8
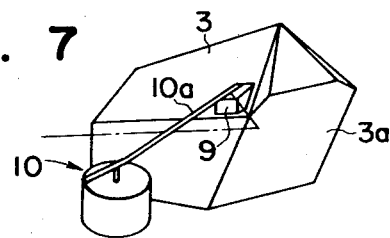
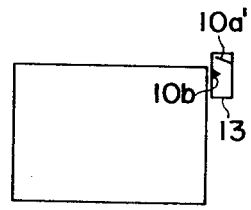

SINGLE LENS REFLEX CAMERA

BACKGROUND OF THE INVENTION

The present invention relates to view finder for a single lens reflex camera, which enables exposure condition information for the camera to be viewed without overlapping onto the image of the object in the vision field of the finder.

In the past, additional prisms provided on the roof-type reflection surfaces of pentagonal prisms for the purpose of conveying exposure condition information through the prism have generally been disposed such that the information conveyed is superimposed on the image of an object in the vision field of the view finder.

The foregoing results in the disadvantage that objects to be photographed as well as the information are obscured. Further, attempts to avoid this difficulty have often resulted in impractical enlargements of the pentagonal prism.

SUMMARY OF THE INVENTION

One object of the present invention is to provide a view finder for a single lens reflex camera wherein the finder is adapted such that objects are easily viewed therethrough even though exposure condition information is arranged for viewing in the field of vision of the finder.

Another object of the invention is to provide a finder for a single lens reflex camera wherein exposure condition information may be viewed in the field of vision of the finder without intentionally enlarging the pentagonal prism.

The characteristics of the present invention and the manner in which the above-mentioned objects are achieved are fully set forth in the following detailed description and the accompanying drawings.

BRIEF DESCRIPTION OF THE DRAWINGS

FIG. 1 is a side elevational view showing the view finder optical system of a single lens reflex camera;

FIG. 2 is a bottom plan view of the pentagonal prism of FIG. 1 viewed in the direction indicated by the arrow P in FIG. 1;

FIG. 3 is a top plan view of the pentagonal prism viewed in the direction shown by the arrow Q in FIG. 1;

FIG. 4 is a front elevational view of the pentagonal prism viewed in the direction shown by the arrow R in FIG. 1;

FIG. 5 is a perspective view illustrating a first embodiment of the present invention wherein a view of a diaphragm opening indicator is shown;

FIG. 6 is an elevational view showing the field of vision of the view finder of the first embodiment;

FIG. 7 is a perspective view illustrating a second embodiment of the present invention wherein a view of an exposure meter dial is shown; and FIG. 8 is an elevational view showing the field of vision of the finder of the second embodiment.

With reference to the accompanying drawings the manner in which pentagonal prisms reflect light rays is well known and need not be described in detail herein. In FIG. 1, light rays from an object pass through an objective lens not shown in the drawings and fall upon a focusing glass 1. Focused light rays of the object leaving the ground glass plane of focusing glass 1 are then viewed through a condenser lens 2, a pentagonal prism 3, and an eyepiece 4.

The focused light rays which are transmitted from focusing glass 1 enter the bottom of prism 3 through the area designated by the letters A, B, C and D in FIG. 2. The rays first fall upon the internal surfaces of the roof-type reflection surfaces within the area defined by the letters $A_1$, $B_1$, $C_1$ and $D_1$ shown in FIG. 3 and are reflected therefrom for a first time in a manner such that they fall upon the area defined by the letters $A_2$, $B_2$, $C_2$ and $D_2$ again on said internal surfaces of the roof-type reflection surfaces. Thereafter, the reflected rays which fall upon the area bounded by the letters $A_2$, $B_2$, $C_2$ and $D_2$ are reflected by the roof-type reflection surfaces for a second time onto the area designated by the letters $A_3$, $B_3$, $C_3$ and $D_3$ on the internal surface of the front lower reflection surface 3a shown in FIG. 4. The rays are reflected from surface 3a and the focusing state of the object can be viewed through eyepiece 4. Thus, a light ray entering the prism, for example, at point A, travels successively through points $A_1$, $A_2$ and $A_3$ and leaves the prism at eyepiece 4.

In accordance with the present invention, an additional prism is provided on either or both of areas 11 and 12 shown by oblique lines in FIG. 3. These areas of the roof-type reflection surface of a pentagonal prism are not associated with either the first reflection or the second reflection of light rays from an object which pass through the objective lens. Light rays from an indicator of exposure condition information may pass through the additional prism or prisms and are directed to fall upon pentagonal prism 3 so that they may be reflected therein. Thus, exposure condition information can be viewed in the vision field of the view finder.

Referring to the first and second embodiments in accordance with the present invention the construction will be described in detail hereinafter.

In the first embodiment, as shown in FIGS. 5 and 6, three reflectors 6, 7, and 8 are provided adjacent pentagonal prism 3 in a position to reflect light rays from a diaphragm opening indicator 5 onto a prism disposed in a position such that reflected rays from reflector 8 are caused to fall upon the roof-type reflection surfaces of the pentagonal prism 3 at an area which is not associated with either the first or second reflection of light rays from the objective lens. After the light rays from the indicator are reflected onto the inner surface of the front lower reflection plane 3a of pentagonal prism 3, the diaphragm opening indicator 5' can be viewed in a position 13 shown in FIG. 6.

FIG. 7 and FIG. 8 show another embodiment in which visual information from an exposure meter 10 can be viewed. On the same roof-type reflection surface of the pentagonal prism as in the case of the first embodiment, a prism 9 is provided at an area where the first and second reflections of picture image light rays are not affected. The visual rays conveying the deviation of pointer 10a of exposure meter 10 are caused to fall upon pentagonal prism 3 through prism 9 and are reflected on the front lower reflection plane 3a of said pentagonal prism 3. Then the visual information can be viewed as shown in FIG. 8. Reference mark 10a' denotes an image of a pointer and 10b denotes an index.

It is to be understood that by using a convex lens for the incident plane of additional prism 9, it is possible to adjust the visibility of image 10a' of the pointer of the exposure meter.

In accordance with the present invention, light rays conveying exposure condition information such as the diaphragm opening of a photographic lens may be reflected on reflectors 6, 7, and 8, and caused to fall upon pentagonal prism 3 through prism 9. The rays are then reflected on the front lower portion 3a of pentagonal prism 3, whereby an image 5' thereof is formed on an area which is not superimposed on the vision field of the finder as shown in FIG. 6. In the same manner, the deviation of pointer 10a of exposure meter 10 may also be caused to fall upon pentagonal prism 3 through prism 9. As shown in FIG. 8, image 10a' of pointer 10a is formed in the vision field of the finder and can be viewed.

As described above, in the present invention, the roof-type reflection surfaces of the pentagonal prism effect two separate reflections. The areas of the roof-type reflection surface which are put to use for the two reflections are different. By providing a prism on areas outside of the areas associated with the two different reflections, exposure condition information may be arranged to pass through the prism, in a manner such that information can be viewed in the vision field of the finder without interfering with the image forming plane of the pentagonal prism and without enlarging the pentagonal prism.

I claim:

1. A view finder for a single lens reflex camera comprising:
   a pentagonal prism having a bottom entrance surface, a roof-type reflecting surface where first and second reflections are formed at predetermined areas, a front lower reflecting surface, and an exit surface for transmitting picture image light rays;
   an objective lens for directing picture image light rays to fall upon the entrance surface of the pentagonal prism; and
   a second prism disposed on said roof-type reflecting surface for directing light rays from an exposure condition information indicator into said pentagonal prism through said roof-type reflecting surface, the second prism being disposed on an area of the roof-type surface outside the areas of the first and second reflections of the picture image light rays formed by the roof-type reflecting surface of said pentagonal prism.

2. A view finder as set forth in claim 1, wherein is included an exposure condition information indicator and an optical system for directing light rays from the exposure condition information indicator into the prism on said roof-type reflecting surface of said pentagonal prism.

3. A view finder as set forth in claim 2, wherein said indicator includes the position scale of a diaphragm adjusting member.

4. A view finder as set forth in claim 2, wherein said indicator includes a scale of a focus adjusting member.

* * * * *